US012210832B2

(12) United States Patent
Choi et al.

(10) Patent No.: US 12,210,832 B2
(45) Date of Patent: Jan. 28, 2025

(54) METHOD OF RESPONDING BASED ON SENTENCE PARAPHRASE RECOGNITION FOR DIALOG SYSTEM

(71) Applicant: Korea Advanced Institute of Science and Technology, Daejeon (KR)

(72) Inventors: Hojin Choi, Daejeon (KR); Kyojoong Oh, Daejeon (KR); Youngjun Lee, Daejeon (KR); Soohwan Park, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 432 days.

(21) Appl. No.: 17/777,813

(22) PCT Filed: Nov. 20, 2019

(86) PCT No.: PCT/KR2019/015953
§ 371 (c)(1),
(2) Date: Nov. 14, 2022

(87) PCT Pub. No.: WO2021/100902
PCT Pub. Date: May 27, 2021

(65) Prior Publication Data
US 2023/0069935 A1 Mar. 9, 2023

(51) Int. Cl.
*G06F 16/33* (2019.01)
*G06F 16/332* (2019.01)
(Continued)

(52) U.S. Cl.
CPC .......... *G06F 40/30* (2020.01); *G06F 16/3329* (2019.01); *G06F 40/247* (2020.01); *G06F 40/268* (2020.01); *G06F 40/295* (2020.01)

(58) Field of Classification Search
CPC ..... G06F 16/3332; G06F 40/268; G06F 40/30
See application file for complete search history.

(56) References Cited

U.S. PATENT DOCUMENTS 10,140,977 B1 11/2018 Raux et al.
10,963,497 B1 * 3/2021 Tablan ................ G06F 16/3344
(Continued)

FOREIGN PATENT DOCUMENTS

CN         106997376 A  *  8/2017  ......... G06F 16/3329
KR    10-2016-0060247 A     5/2016
(Continued)

OTHER PUBLICATIONS

Leevi Co., Ltd., "Development of Conversational Solution for Intelligent Chat Services Based on Pragmatic and Context Analysis of Dialogues;" Published online Jun. 14, 2018 on http://www.ndsl.kr/ndsl/search/detail/report/reportSearchResultDetail.do?cn=TRKO201800042054; Part 1 of 2; 40 Pages.
(Continued)

*Primary Examiner* — Daniel Abebe
(74) *Attorney, Agent, or Firm* — DALY, CROWLEY, MOFFORD & DURKEE, LLP

(57) ABSTRACT

In a method of responding based on sentence paraphrase recognition for dialog system, main keywords of a domain and patterns thereof are recognized and extracted based on a morpheme analysis result in a pre-processing process. Question domains/sub-categories/dialogue-acts are classified using the morpheme analysis result and the extracted main keywords and patterns. Learning a model is performed using classification features of the classified question domains, sub-categories, and dialogue-acts as semantic features of query sentences, and sentence semantic vectors are extracted by measuring similarity between the vectors. A language model of letters is trained and similarity in expression and structure is analyzed by extracting a sentence expression vector based on the letter. An answer to a similar question is provided by generating a vector containing semantic and expressive information about an input query
(Continued)

sentence based on analyzed semantic and expressive similarities, and finding a similar query sentence from FAQ knowledge using a paraphrase recognition technology. In a dialog system for automatic Q & A service such as a chatbot for customer consultation, it is possible to provide related answers by exploring question-and-answer knowledge (questions) that have similar meanings and intentions of input sentences (query) through paraphrase recognition technology.

11 Claims, 10 Drawing Sheets

(51) Int. Cl.
*G06F 40/247* (2020.01)
*G06F 40/268* (2020.01)
*G06F 40/295* (2020.01)
*G06F 40/30* (2020.01)

(56) References Cited

U.S. PATENT DOCUMENTS

| | | | | |
|---|---|---|---|---|
| 11,055,355 | B1 * | 7/2021 | Monti | G06F 16/90332 |
| 11,586,814 | B2 * | 2/2023 | Jiang | G06F 40/237 |
| 12,001,422 | B2 * | 6/2024 | Yeo | G06F 16/211 |
| 2016/0140958 | A1 * | 5/2016 | Heo | G06F 40/30 704/9 |
| 2017/0109354 | A1 * | 4/2017 | Boxwell | G06N 5/02 |
| 2017/0109434 | A1 * | 4/2017 | Boxwell | G06N 20/00 |
| 2019/0392066 | A1 * | 12/2019 | Kim | G06F 16/24578 |

FOREIGN PATENT DOCUMENTS

| | | |
|---|---|---|
| KR | 10-2019-0072823 A | 6/2019 |
| KR | 10-2019-0109614 A | 9/2019 |

OTHER PUBLICATIONS

Leevi Co., Ltd., "Development of Conversational Solution for Intelligent Chat Services Based on Pragmatic and Context Analysis of Dialogues;" Published online Jun. 14, 2018 on http://www.ndsl.kr/ndsl/search/detail/report/reportSearchResultDetail.do?cn=TRKO201800042054; Part 2 of 2; 37 Pages.

International Search Report (with English Translation) dated Aug. 14, 2020 for International Application No. PCT/KR2019/015953; 4 Pages.

* cited by examiner

| | QUESTIONS | SIMILARITY |
|---|---|---|
| INPUT QUESTION | HOW DO I REGISTER A ONE-TIME PASSWORD (OTP) FROM OTHER BANK IN A SMART APPLICATION? | |
| 1ST PARAPHRASE | HOW DO I REGISTER THE OTP FROM OTHER BANK? | 0.84949 |
| 2ND PARAPHRASE | HOW DO I REGISTER AN OTP CARD FROM OTHER BANK? | 0.738873 |
| 3RD PARAPHRASE | I RENEWED THE OTP OF ANOTHER BANK. HOW DO I REGISTER FOR USE? | 0.737727 |
| 4TH PARAPHRASE | I WANT TO REGISTER OTHER BANK OTP. | 0.730637 |
| 5TH PARAPHRASE | HOW DO I DO REGISTRATION OF OTHER BANK OTP? | 0.730637 |

EX.)

| | QUESTIONS | SIMILARITY |
|---|---|---|
| INPUT QUESTION | I APPLIED TO CLOSE AN EXPIRED INSTALLMENT SAVING ACCOUNT THROUGH INTERNET BANKING, BUT NOW CLOSING IS NOT EFFECTIVE. | |
| 1ST PARAPHRASE | IT IS SAID THAT CLOSING THE EXPIRED INSTALLMENT SAVING ACCOUNT IS POSSIBLE THROUGH MOBILE, BUT IT CANNOT BE CLOSED. | 0.828621 |
| 2ND PARAPHRASE | HOW DO I CANCEL MY INSTALLMENT SAVING ACCOUNT? | 0.691561 |
| 3RD PARAPHRASE | I WANT TO CANCEL MY INSTALLMENT SAVING ACCOUNT. | 0.668507 |
| 4TH PARAPHRASE | I WANT TO CANCEL MY INSTALLMENT SAVING ACCOUNT. DO I HAVE TO VISIT A BRANCH? | 0.636741 |
| 5TH PARAPHRASE | I WANT TO CANCEL MY INSTALLMENT SAVING. DO I HAVE TO VISIT THE BANK? | 0.634125 |

METHOD OF RESPONDING BASED ON SENTENCE PARAPHRASE RECOGNITION FOR DIALOG SYSTEM

CROSS-REFERENCE TO RELATED APPLICATION

This application is a U. S. National Stage Application of International application No. PCT/KR2019/015953 filed on Nov. 20, 2019. The disclosures of the above-listed applications are hereby incorporated by reference herein in their entirety.

BACKGROUND

Technical Field

The present inventive concept relates to a method of searching for question-answer knowledge (questions) having similar meaning and intent with those of an input sentence (query) through a paraphrase recognition technology to provide a related answer.

Background Technology

The present invention is an invention that can be utilized in the frequently asked questions (FAQ) service, customer consultation service, etc., and may be applied to a dialogue system for automatic question and answer (Q & A). The present invention utilizes natural language processing and understanding technology based on sentence embedding technology, and through this, it is possible to search for questions that have similar meaning and intent to the entered question.

An intelligent Q & A service is a service that provides an answer to a question input by a user. A response to a user's query is provided through various types of systems such as community-style online platforms, where experts or other users provide answers, such as NAVER Knowledge, Quora, and Yahoo! Answers, or Intelligent Q & A systems that automatically provide answers based on advanced natural language processing technologies and built knowledge bases, such as IBM Watson and ETRI's Exobrain.

A dialogue system refers to a computer system that is goal-oriented and communicates with a user. In general, the process of questions and answers communicated between the user and the computer is performed in a form of conversation. It is mainly done in such a way that when a user's query is input, it responds appropriately to the need by immediately processing the user's query input. Recently, context-based dialogue analysis that provides responses by analyzing conversations made over several turns, and asynchronous response providing methods have been studied. The present invention to be described below relates to a method of providing an automatic Q & A service using these dialog systems.

For the interaction between a user and a computer in the dialog system, a high-level technology for processing and understanding natural languages is required. In the present invention, morpheme analysis and part-of-speech (POS) tagging, which are basically performed for the interaction, natural language processing such as extraction and recognition of entity names, and natural language understanding such as sentence embedding, domain/intent classification, and paraphrase recognition are performed.

In the present invention, the sentence embedding technology is a method used in the technical fields of domain/intent classification of query sentences, sentence similarity analysis, and paraphrase recognition. Similar to the word embedding technology, which is already well-known, the sentence embedding technology expresses a sentence as a real number vector of a fixed size by converting a natural language representation to a vector representation. To this end, a machine learning model based on deep learning is used, and sentences are embedded as vectors by using the domain and dialogue-act classification system tailored to the applied domain together as learning features. By vector-representing a sentence, semantic/structural information can be expressed as numerical and spatial information, and classification, clustering, and similarity measurement can be performed through this vector.

SUMMARY

Technical Object

It is an object of the present invention to provide a method of searching for a Q & A knowledge (a query) that have a similar meaning and an intention of an input sentence (a question) through a paraphrase recognition technology and providing an answer related to the searched question in a dialog system for automatic Q & A service such as a chatbot for customer consultation.

Technical Solution

A method of responding based on sentence paraphrase recognition for a dialog system according to exemplary embodiments of the present invention is executable by a processor of a computer device. The method includes the steps of extracting main keywords of a technology application domain and patterns thereof by recognizing them based on a morpheme analysis result obtained through analysis of morphemes in a pre-processing process; classifying question domains/detailed categories/dialogue-acts using the morpheme analysis result obtained from the pre-processing process and the extracted main keywords and patterns; analyzing a semantic similar question for measuring similarity between sentence semantic vectors by learning a model using classification features obtained from classified question domains, detailed categories, and dialogue-acts as semantic features of a question sentence, and by extracting the sentence semantic vectors; analyzing an expressive similar question, through learning a language model of letters, by extracting a sentence expression vector based on the letter and analyzing similarity in expression and structure; and providing an answer to a similar question by generating a vector containing semantic and expressive information about an input query sentence that can be input in various forms based on analyzed semantic similarity and expressive similarity, and finding a similar query sentence, for which the answer is provided, from FAQ knowledge using a paraphrase recognition technology.

In an embodiment, the step of 'extracting main keywords of a technology application domain and patterns thereof' may include recognizing an entity name dedicated to the technology application domain; extracting a compound word information additionally specialized for the application domain by using the morpheme analysis results; analyzing synonym/hypernym to normalize a specific term expression or analyze synonym information or hypernym information of a specific expression; and extracting a question expression pattern to pattern question expressions of entity names, compound words, synonyms, and hypernyms extracted in the previous step for the input query according to connection relationship.

In an embodiment, the step of 'extracting main keywords of a technology application domain and patterns thereof' may include building a domain-specific entity name and compound word dictionary based on the morpheme analysis result obtained in the pre-processing process; and building a relationship of vocabularies in the built entity name and compound word dictionary with a thesaurus or lexical network of synonyms and hypernyms.

In an embodiment, the step of 'classifying question domains/detailed categories/dialogue-acts' may include a first learning step and a classification step. The first learning step may include tagging and constructing learning data to tag query sentence classification system features for Q & A specialized in a system application domain for each question; and learning a question intention classification model to train a deep learning-based classification model with learning data built. The classification step may include 'classifying question intention' to perform feature analysis on a new input query sentence using a learned classification model; and 'textualizing analysis result and semi-automatically tagging additional learning data' to modify and additionally build learning data through analysis process and review of features of additional test query sentences using a trained model.

In one embodiment, the step of 'classifying question domains/detailed categories/dialogue-acts' may include making learning data using the obtained morpheme analysis result and the extracted important keywords and patterns in the pre-processing process, learning a classification model based on the learning data, and extracting the corresponding classification features for a new query sentence.

In an embodiment, the step of 'analyzing a semantic similar question' may include a second learning step and a first similarity analysis step. The second learning step may include 'a sentence morpheme tagging and semantic quality (domain, dialogue act) classification step' in which a word embedding vector of sentence morpheme learned with a result of analysis by a language analyzer (morpheme tagging) and classification features analyzed through a classification model are used as semantic features and structured into an input structure; and 'a semantic feature based sentence embedding model learning step' in which trains a deep learning model that combines a Seq2Seq-based encoder-decoder model and a learned classification model. The first similarity analysis step may include a question intent embedding step of embedding a new input query sentence into a sentence semantic vector using the learned encoder model; and an embedding vector-based semantic similarity measurement step in which a similarity between a query sentence and FAQ questions with refined answer knowledge is measured through a similarity measurement method between vectors using sentence semantic vectors converted.

In an embodiment, the 'question intent embedding step' may include converting the input query sentence into a real vector of a desired dimension.

In an embodiment, the step of 'analyzing an expressive similar question' may include a third learning step and a second similarity analysis step. The 'third learning step' may include a 'character-level tokenization step' of generating an input vector at a character-level to implement an encoder-decoder model that learns a language model of a character appearing in a query sentence; and a 'character expression-based embedding model learning step' of learning the encoder-decoder model of the letters appearing in the query sentence. The 'second similarity analysis step' may include a character-level embedding performing step of using the learned character-level embedding model and generating a sentence expression vector having only expression information of a sentence using characters only; and an embedding vector-based expressive similarity measurement step of measuring explicit similarity of the input sentence with respect to letter and structure using sentence expression vectors analyzed.

In an embodiment, the 'step of analyzing an expressive similar question' may include learning a language model of letters, and extracting a sentence expression vector based on the letters, and analyzing similarity in expression and structure of the sentence expression vector.

In one embodiment, the 'step of providing an answer to a similar question' may include a semantic similarity question analysis step and an expressive similarity question analysis step, and may include searching for a FAQ question similar to the input question using the analyzed similarity result, and determining whether to provide an answer or not.

In one embodiment, the 'step of providing an answer to a similar question' may include recognizing a paraphrase sentence of a purified FAQ query sentence based on the analyzed semantic similarity and expressive similarity, and providing an answer to the corresponding FAQ question sentence according to a similarity score.

Effects of the Invention

The present invention provides as a source technology for providing an answer in a dialog system for an automatic Q & A service such as a chatbot for customer consultation. This technology can convert natural language query sentences, which may be transformed into various expressions to be input, into vectors containing semantic and structural information, and using the vectors, it is possible to determine whether the input query is similar to a sentence of established knowledge. In addition, it is possible to address an answer to a query by determining whether or not to provide an answer to the corresponding input according to the similarity score. When it is desired to provide a strictly refined answer according to the technology application domain, such as the financial domain, there is an advantage of providing a reliable answer compared to the method using the sentence generation model.

BRIEF DESCRIPTION OF THE DRAWINGS

FIG. 10 is an exemplary result of a similarity measurement between an input query sentence and a similar sentence recognized as a paraphrase.

DETAILED DESCRIPTION OF THE EMBODIMENTS

Figure 1:
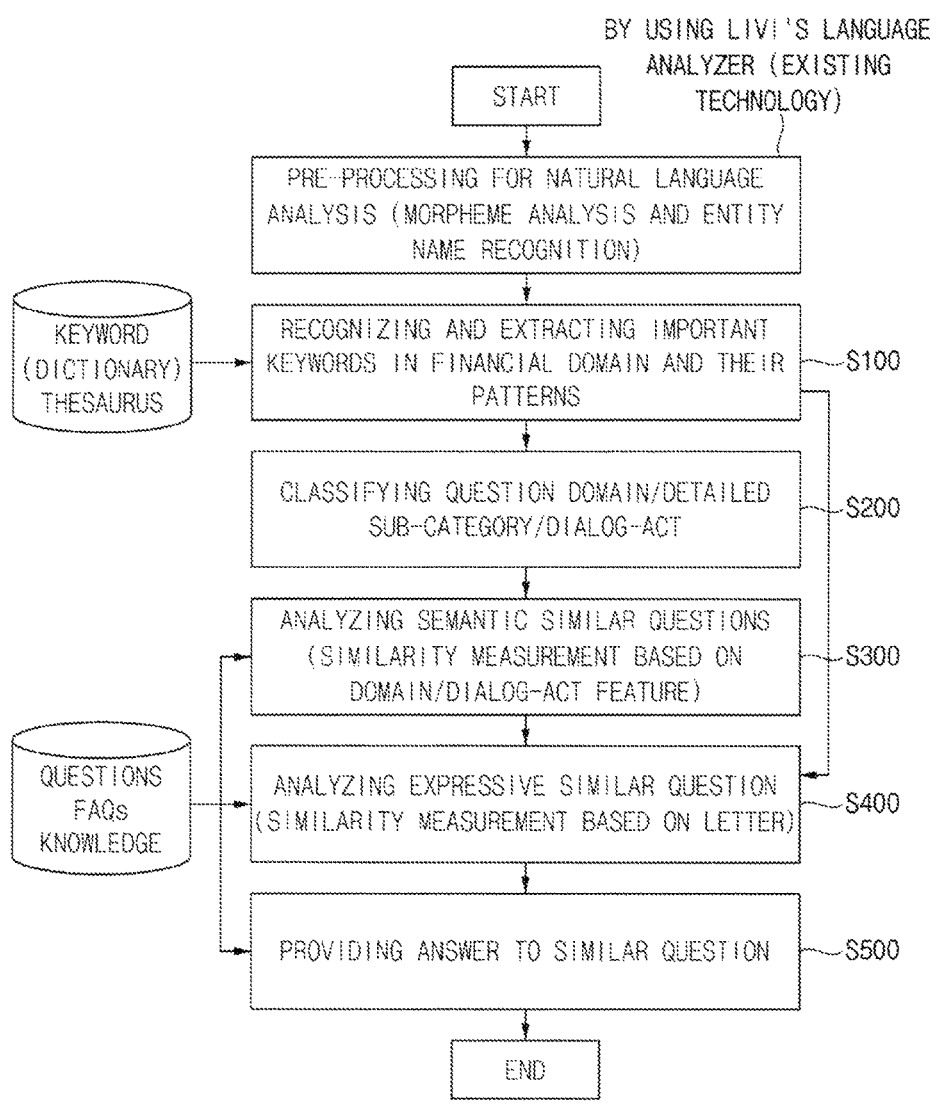
FIG. 1 is a flowchart illustrating an answer method of an automatic Q & A dialogue system according to paraphrase recognition based on the similarity of sentence embedding in accordance with an embodiment of the present invention.

The detailed description of the present invention is given below for the specific embodiments in which the present invention may be practiced, by way of illustration referring to the accompanying drawings. These embodiments are described in sufficient detail to enable the one of ordinary skill in the art to practice the present invention. It should be understood that the various embodiments of the present invention are different but need not be mutually exclusive. For example, certain structures, architectures, and features described herein may be implemented in other embodiments with respect to one embodiment without departing from the spirit and scope of the present invention. In addition, it should be understood that the location or arrangement of individual elements within each disclosed embodiment may be changed without departing from the spirit and scope of the present invention. Accordingly, the following detailed description is not intended to be construed in a limiting sense, and the scope of the present invention, if properly described, is limited only by the appended claims, along with all scope equivalents to those claimed. Like reference numerals in the drawings refer to the same or similar functions throughout the various aspects of the embodiments.

Hereinafter, a method of searching for question-answer knowledge (question) having similar meaning and intent of an input sentence (query) and providing an answer related to the search result through a paraphrase recognition technology according to an embodiment of the present invention is described with reference to the accompanying drawings.

FIG. 1 is a flowchart illustrating an answering method of an automatic Q & A dialogue system according to paraphrase recognition based on the similarity of sentence embedding according to an embodiment of the present invention.

Referring to FIG. 1, the answering method of sentence paraphrase recognition-based dialog system may include a step of recognizing important keywords and extracting patterns thereof in the technology application domain S100, a step of classifying question domain/subcategory/dialogue-act S200, a step of analyzing semantic similar questions S300, a step of analyzing expressive similar question S400, and a step of providing an answer to a similar question S500.

Figure 7:
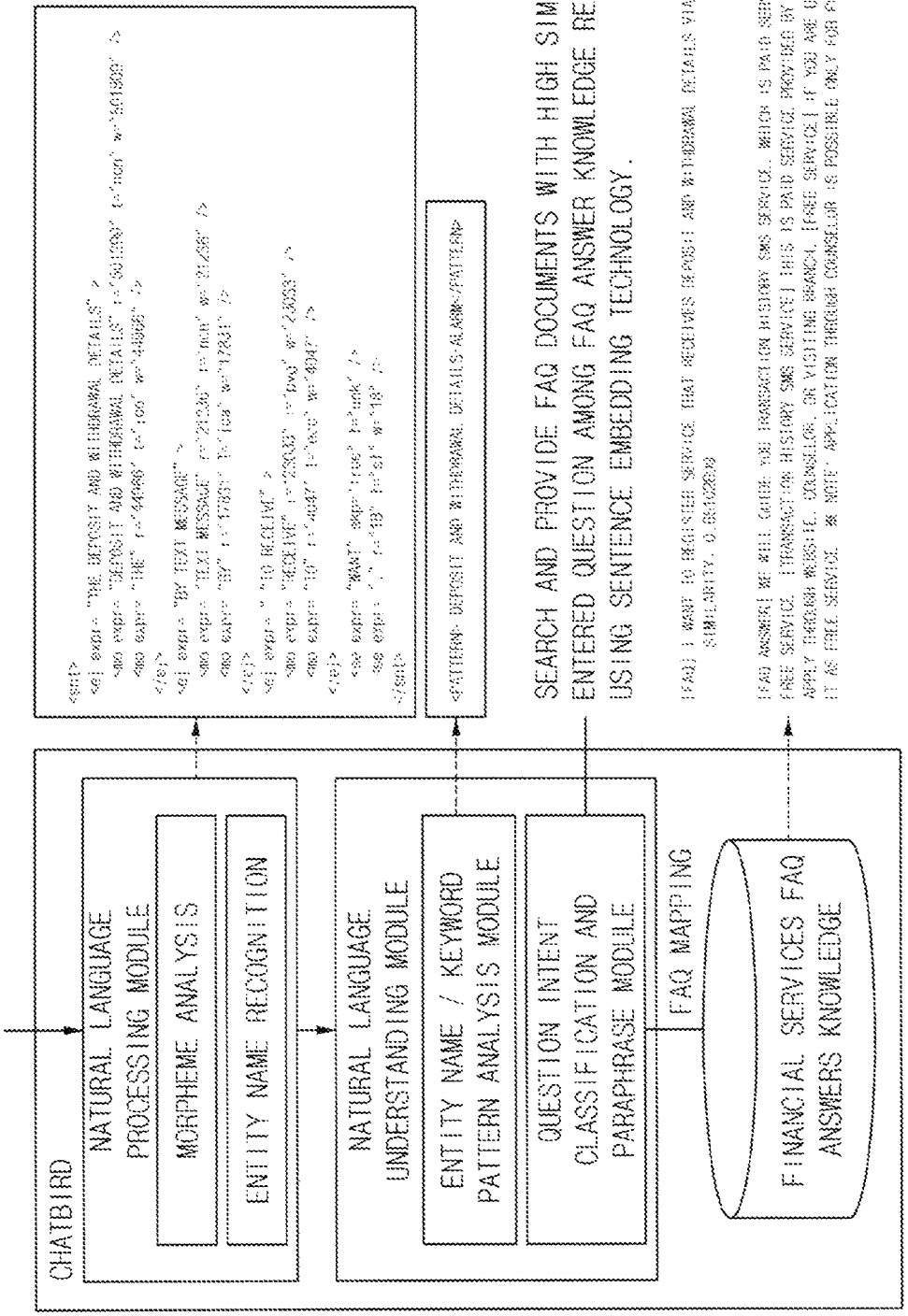
FIG. 7 is a conceptual diagram of a method of responding in a sentence paraphrase recognition-based dialogue system.

FIG. 7 is a conceptual diagram of a method of responding in a sentence paraphrase recognition-based dialogue system. Referring to FIG. 7, an exemplary embodiment of the method of answering in a sentence paraphrase recognition-based dialogue system is presented.

The step of recognizing important keywords and extracting patterns thereof in the technology application domain S100 may be performed based on the results of morpheme analysis performed in a process of pre-processing. This step is a process of analyzing entity names, compound words, synonyms, hypernyms, etc. related to the applied domain in the input query sentences, and patterning them to extract their features so that answers and questions can be mapped. In the step, a domain-specific entity name dictionary and compound word dictionary are built in a semi-automatic way through a machine learning model for extracting entity name/compound word candidates, and synonym and hypernym concept information of the dictionary vocabulary are constructed as a vocabulary network or thesaurus. Through this, important keywords that can be answered from the input query can be extracted, and some verb expressions can also be expressed as synonymous or higher-level concepts.

The step of classifying question domain/subcategory/dialogue-act S200 is to analyze the question domain/sub-category/dialogue-act feature of a new input query sentence. This step may be performed using the morpheme analysis result obtained in the process of pre-processing and the extracted important keywords and patterns. Along with the pattern information extracted in step S100, domain, category, and dialogue-act information are used to build question-and-answer knowledge or to find answers. In the learning process of this step S200, it is necessary to tag the domain, sub-category, and dialogue-act information for each learning question data. In the embodiment according to the present invention, the question intention classification model may use a deep learning-based neural network model. Alternatively, the question intent classification model may substitute other learning-based classification models. In addition, it can be used for semi-automatic construction of additional learning data by reviewing the classification results of new query sentences.

The step of analyzing semantic similar questions S300 is to learn a model using the question domain/subcategory/dialogue-act classification feature classified in step S200 as a semantic feature of the query sentence, and extract sentence semantic vectors to measure a similarity between the vectors. That is, in this step S300 a process of performing sentence embedding of vectorizing an input query sentence to a predetermined length, and measuring a semantic similarity between the question and the FAQ knowledge. To this end, a sentence embedding model learning process may be performed in advance. In addition, the domain, subcategory, dialogue-act feature, and query sentence constructed in S200 may be learned in the learning model of FIG. 8.

The step of analyzing expressive similar question S400 is a process of embedding a sentence into a vector using only the letters and structure information of the input sentence. In this step S400, learning a language model of letters and extracting a sentence expression vector based on the letters may be performed, and analyzing the similarity between expressions and structures of the input sentence may be performed. If a keyword pattern has not been extracted from the input sentence or an answer could not be provided in the previous step because the domain or subcategory feature is not classified, an answer or response to an expression similar to the input sentence can be provided through this step.

The step of providing an answer to a similar question S500 is a process of determining whether to provide an answer to the input question sentence by using the similar sentence analysis result obtained in steps S300 and S400 as a similarity score. That is, this step S500 is, based on the analyzed semantic similarity obtained in step S300 and the expressive similarity obtained in step S400, to create a vector in which semantic and expressive information about the input query sentence that can be input in various forms is embedded, and to provide answers by finding similar query sentences from the FAQ knowledge using the paraphrase recognition technology.

Figure 2:
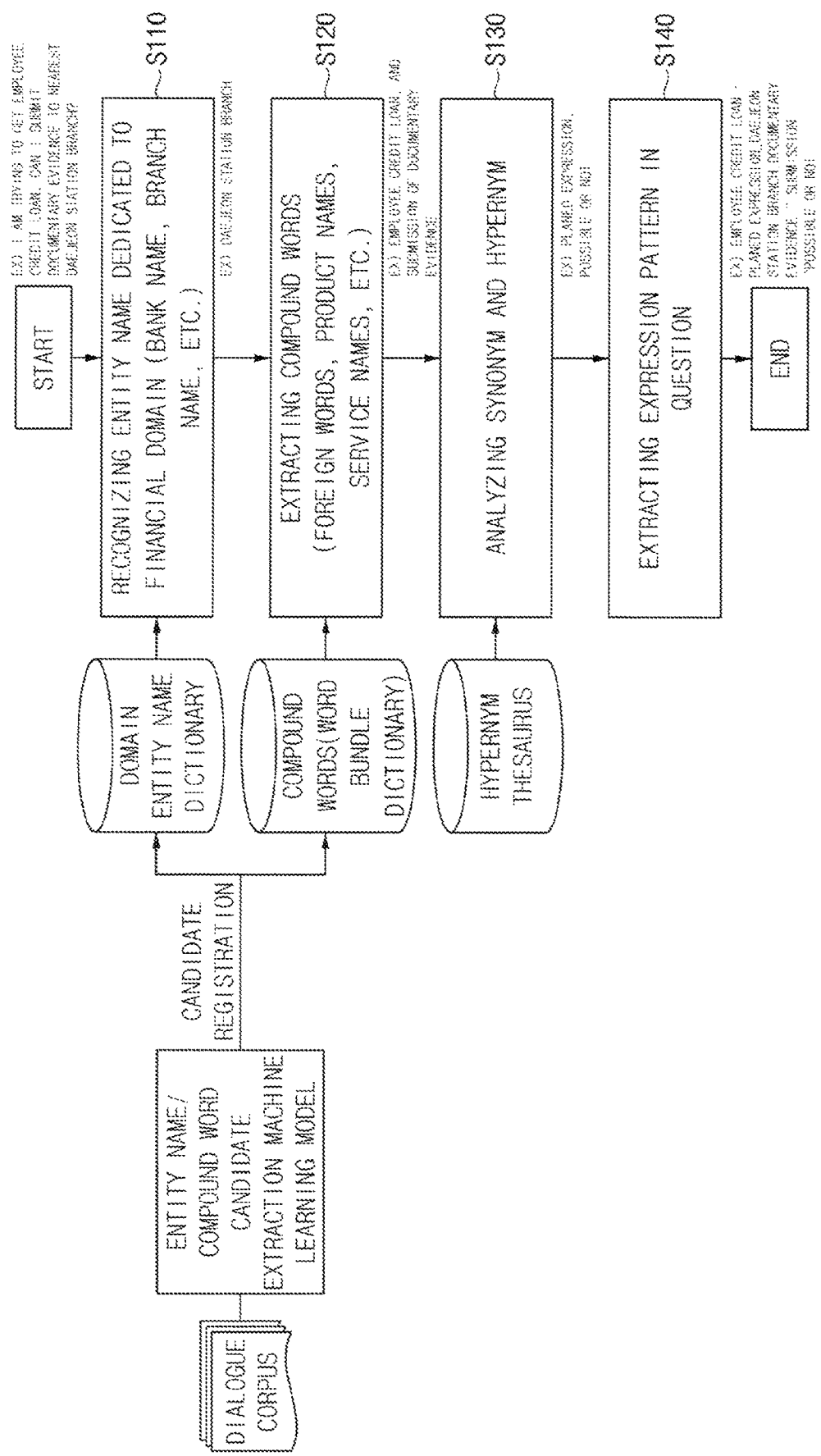
FIG. 2 is a detailed flowchart of the step of extracting important keywords and patterns thereof in the technology application domain by recognizing them according to an embodiment of the present invention.

FIG. 2 illustrates a detailed flowchart of the step of extracting important keywords and patterns thereof in the technology application domain S100 by recognizing them according to an embodiment of the present invention.

Referring to FIG. 2, in an exemplary embodiment the step of recognizing main keywords to extract the main keywords and patterns thereof in the technology application domain S100 may include a technology application domain dedicated entity name recognition step S110, a compound word extraction step S120, a synonym/hypernym analysis step S130, a question expression pattern extraction step S140, and the like.

The technology application domain-only entity name recognition step S110 according to an exemplary embodiment may be a process of recognizing the entity name dedicated to the technology application domain. In an exemplary embodiment, the entity name dedicated to the technology application domain may include a financial institution name, a specific product name, a place name (branch name), amount information, date information, non-identifying expression, and the like. In this step, it is possible to construct a specific entity name dictionary and a compound word dictionary specified for specific domains using the existing entity name recognition technology.

The compound word extraction step S120 according to an exemplary embodiment may be a process of additionally extracting compound word information specialized for an application domain by using the morpheme analysis result, and may be utilized to capture a specific product name or important keyword in an input sentence. Similar to the entity name dictionary, a separate dictionary may be built according to the application domain, and in this process, entity name/compound word candidates may be extracted using a machine learning model. A system developer may decide whether to pre-register this semi-automatically or not.

The synonym/hypernym analysis step S130 according to an exemplary embodiment may be a process of normalizing expressions of a specific term or analyzing synonym information or hypernym information of a specific expression. It may be possible to establish a relationship between the vocabularies of the entity name dictionary and the compound word dictionary constructed in the previous step as a thesaurus or lexical network of synonyms and hypernyms.

The question expression pattern extraction step S140 according to the exemplary embodiment may be a process of patterning question expressions, such as entity names, compound words, synonyms, and hypernyms, for the input query extracted in the previous step according to a connection relationship.

Figure 3:
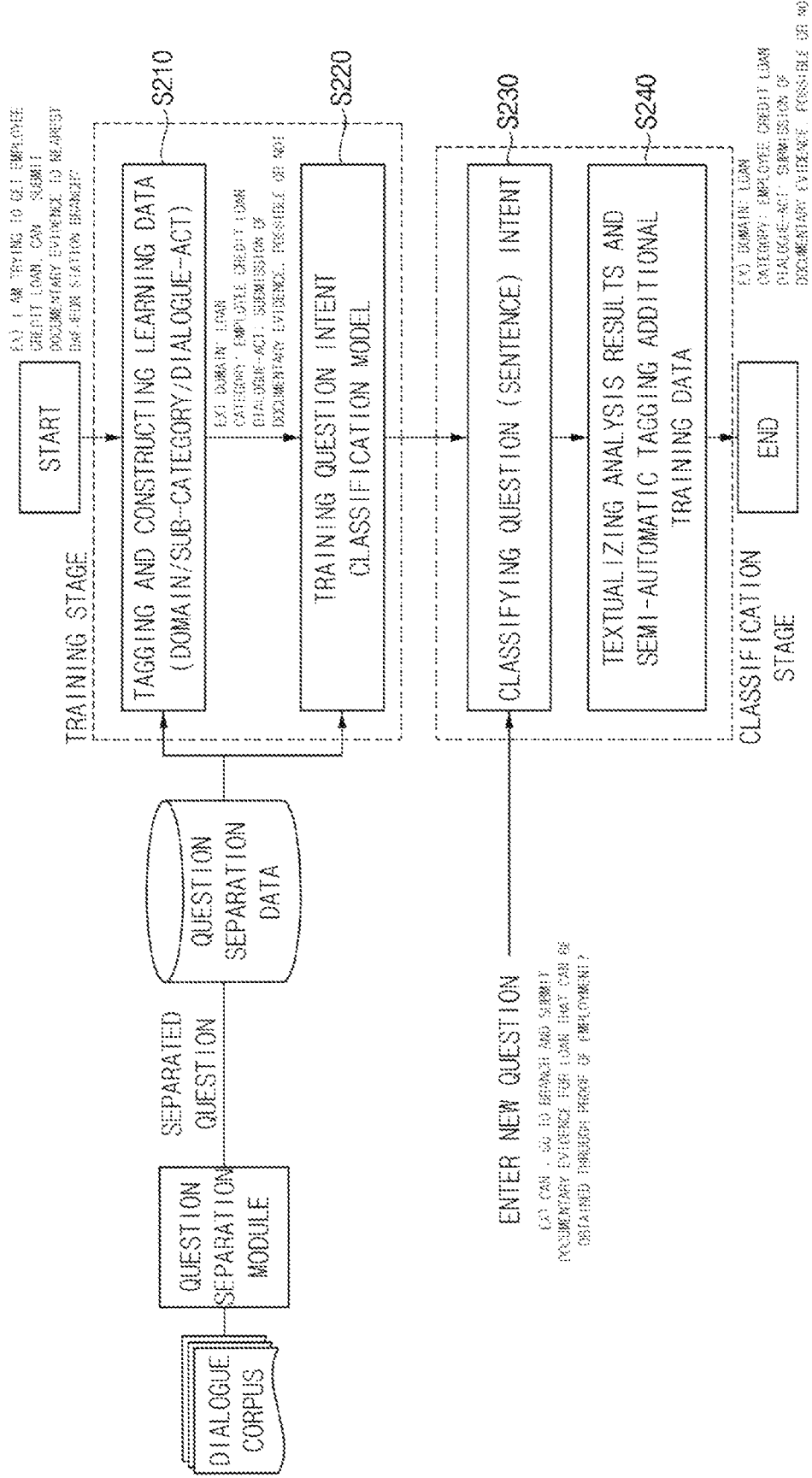
FIG. 3 is a detailed flowchart of a question domain/subcategory/dialog-act classification step according to an embodiment of the present invention.

FIG. 3 illustrates a detailed flowchart of the question domain/subcategory/dialogue-act classification step (S200) according to an embodiment of the present invention.

Referring to FIG. 3, the step of classifying question domain/subcategory/dialogue-act S200 according to an exemplary embodiment may be largely divided into a learning step and a classification step. The learning step may include a step of tagging and building learning data S210, a step of learning a question intention classification model S220, and the like. The classification step may include a step of classifying the question intention S230, and a step of textualizing analysis results and semi-automatic tagging additional learning data S240.

In an exemplary embodiment, the step of tagging and building learning data S210 may be a process of tagging query sentence classification system features, which are for the Q & A specialized for a system application domain, for each question. In this step, data for learning and evaluating a classification model may be created by tagging the features such as domain, subcategory, and dialogue-act.

In an exemplary embodiment, the step of learning a question intention classification model S220 may be a process of learning the training data built in the previous step S210 in a deep learning-based classification model. Classification performance may be compared by implementing four learning-based classification models (SVM, RF, FC-MLP, and ELM). In an exemplary embodiment, a classification model based on FC-MLP may be used.

The step of classifying the question intention S230 according to an exemplary embodiment may be a process of performing a feature analysis on a new input query sentence using a learned classification model, which may be used to provide a rule-based answer and evaluate the classification accuracy of the classifier itself. In addition, it may be used to determine a threshold for providing future answers based on the classification prediction rate and classification accuracy through the analysis process.

In an exemplary embodiment, the step of textualizing analysis results and semi-automatic tagging additional learning data S240 may be a process for additionally building learning data. In the step S240, features of the additional test query sentence may be analyzed through the learned model, and the learning data may be corrected and additionally constructed through review. In order to improve the feature extraction performance of the machine learning-based classification model, more refined learning data are needed.

Figure 4:
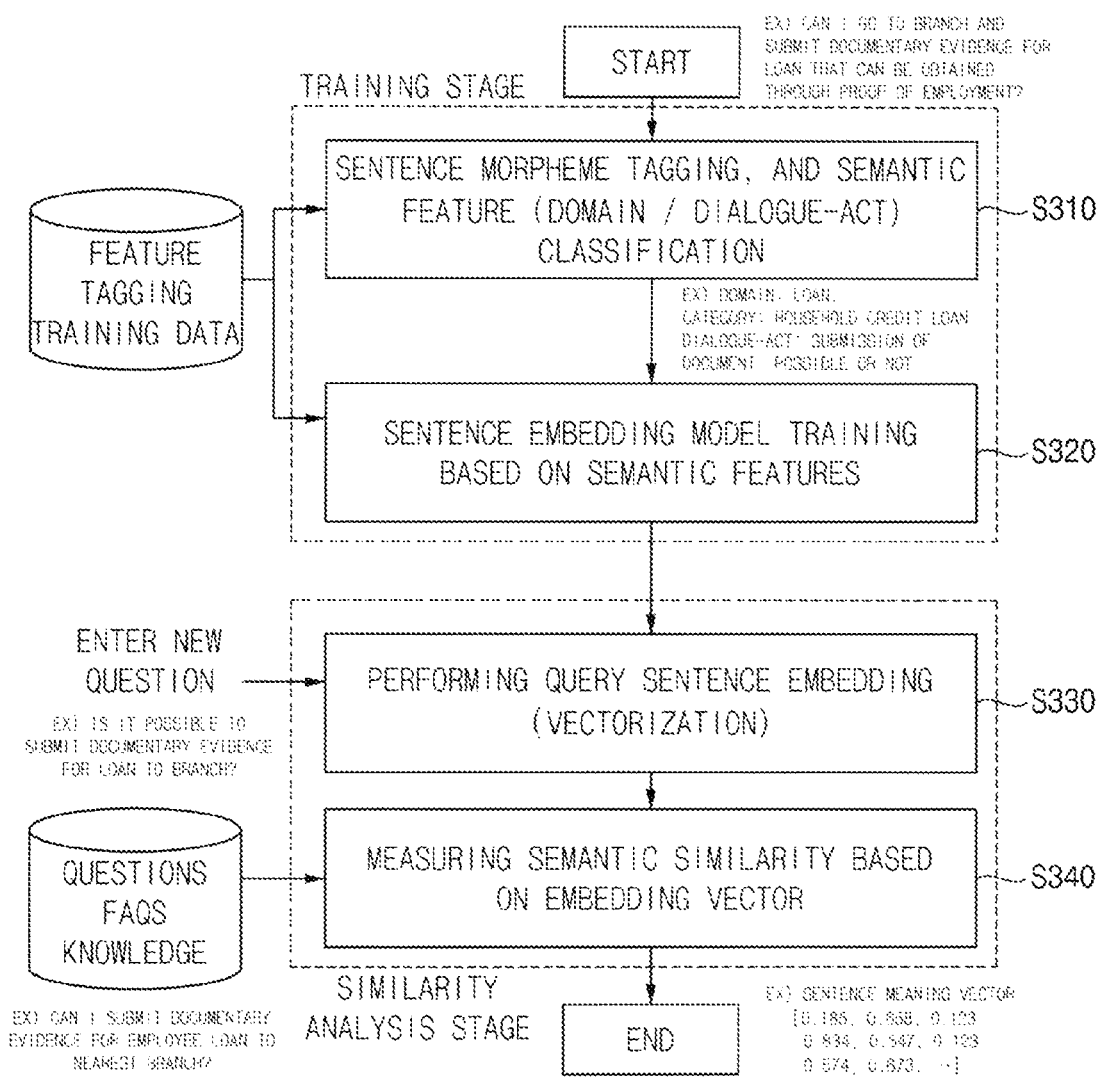
FIG. 4 is a detailed flowchart of a semantic similar question analysis step according to an embodiment of the present invention.

FIG. 4 illustrates a detailed flowchart of a semantic similar question analysis step according to an embodiment of the present invention.

Referring to FIG. 4, in an exemplary embodiment, the semantic similar question analysis step may be divided into a learning step and a similarity analysis step. The learning step may include a step of tagging sentence morpheme and classifying semantic feature (domains, and dialogue-acts) S310, and a step of learning semantic feature-based sentence embedding model S320. The similarity analysis step may include a step of performing question intention embedding S330 and a step of measuring semantic similarity based on an embedding vector S340.

In an exemplary embodiment the step of tagging sentence morpheme and classifying semantic feature (domains, and dialogue-acts) S310 is a process of organizing data to be trained in the model by collecting the results analyzed in the previous step. In this process, the word embedding vectors of the sentence morpheme learned as a result of analysis by the language analyzer (morpheme tagging) and the classification features analyzed through the classification model, which are used as semantic features, are structured as an input structure.

In an exemplary embodiment, the step of learning semantic feature-based sentence embedding model S320 may be a process of learning a deep learning model that combines a Seq2Seq-based encoder-decoder model and the classification model learned in the previous step S200. Through this model, it is possible to build an encoder model that learns the language model of a sentence and at the same time generates a sentence semantic vector containing semantic information such as domain, category, and dialogue-act classification.

In an exemplary embodiment, the step of performing question intention embedding S330 may be a process of embedding a new input query sentence into a sentence semantic vector using the encoder model learned in the previous step S320. In this process, with respect to the input query sentence, the question is transformed into a real vector of a desired dimension.

In an exemplary embodiment, the step of measuring semantic similarity based on an embedding vector S340 may be a process to measure the similarity between the query sentence and the FAQ question with refined answer knowledge through the similarity measurement method between vectors by using the sentence semantic vector converted in the previous step. In the exemplary embodiment, a method of using cosine similarity, which can measure the similarity between vectors, may be used, and the method may be replaced by a similar method for measuring the similarity between vectors.

Figure 8:
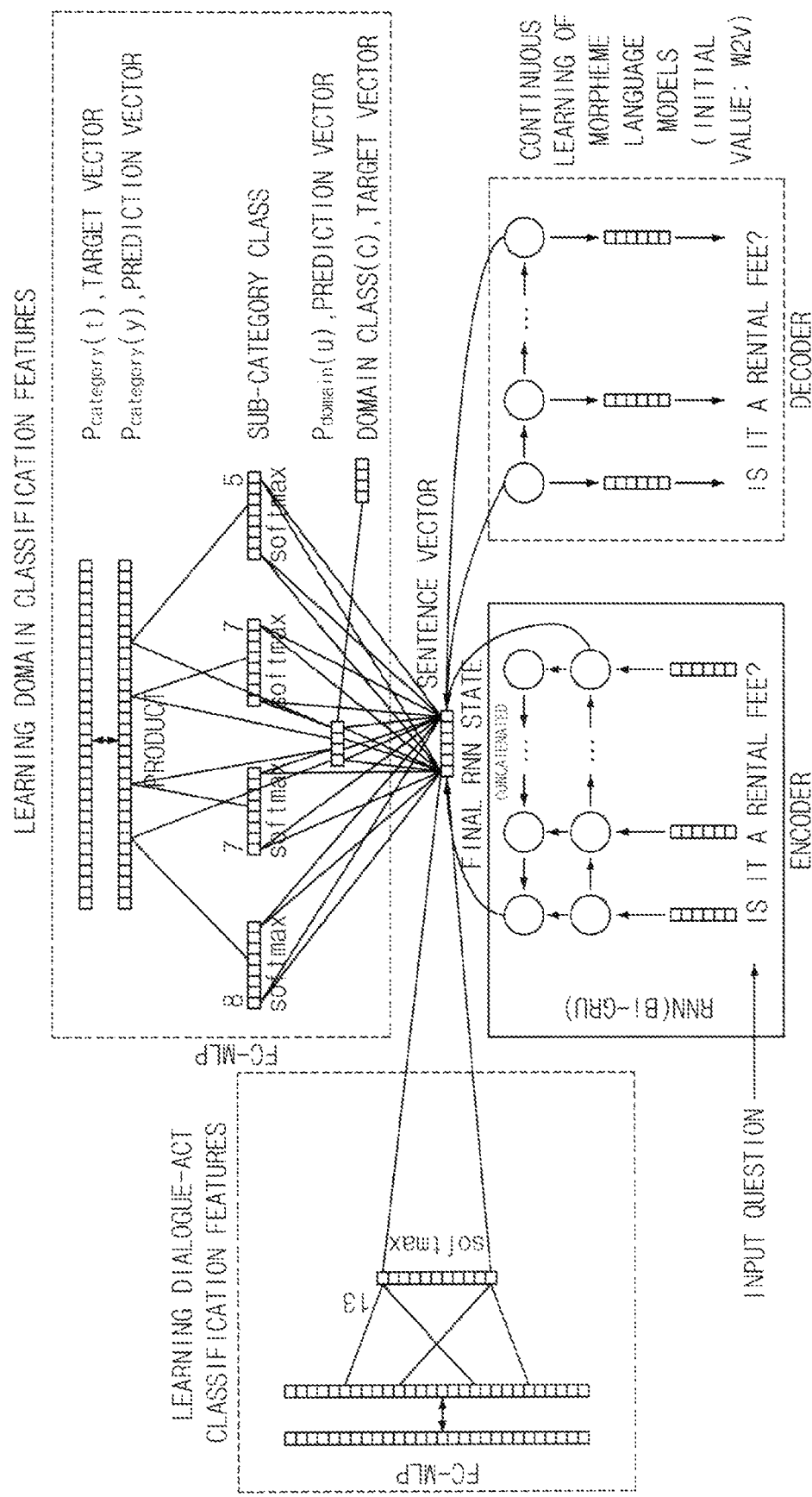
FIG. 8 shows an embodiment of a learning model for embedding a query sentence used for semantic similar question analysis in the present invention, in which for the generation of the sentence semantic vector, the input query sentence, domain, sub-category, and dialogue-act information are required and used as an input and out of the present model.

FIG. 8 shows an embodiment of a learning model for embedding a query sentence used for semantic similar question analysis in the present invention. In order to generate the sentence semantic vector, the input query sentence, domain, sub-category, and dialogue-act information are required and may be used as an input of the learning model illustrated in FIG. 8.

Figure 5:
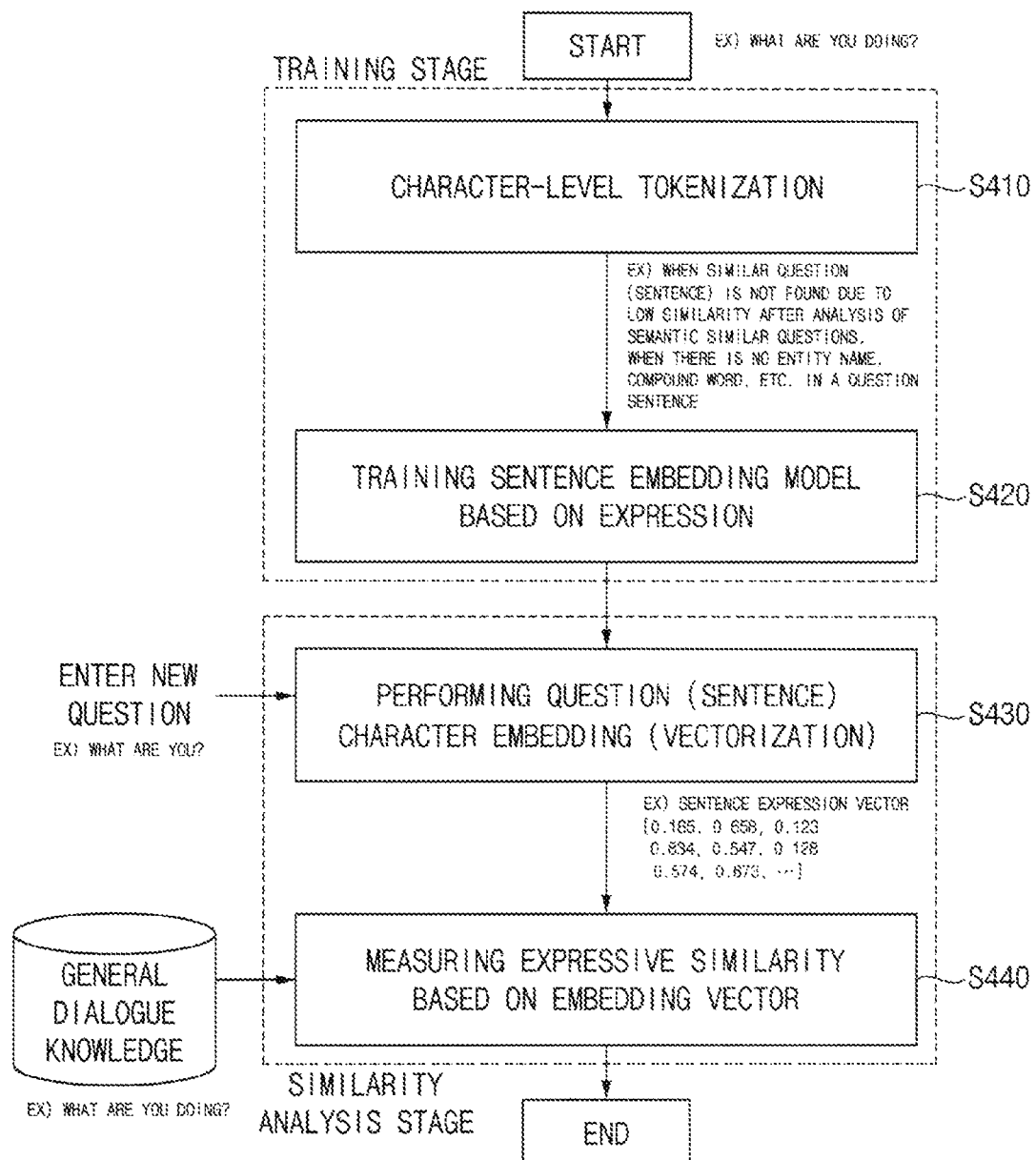
FIG. 5 is a detailed flowchart of the step of analyzing expressive similar question according to an embodiment of the present invention.

Next, FIG. 5 illustrates a detailed flowchart of the step of analyzing expressive similar question S400 according to an embodiment of the present invention.

Referring to FIG. 5, in an exemplary embodiment the step of analyzing expressive similar question S400 may also include a learning step and a similarity analysis step. The learning step may include a step of tokenizing in character units S410 and a step of learning a character expression-based embedding model S420. The step of analyzing the similarity may include a step of performing character-level embedding S430 and a step of measuring the expressive similarity based on an embedding vector S440.

In an exemplary embodiment, the step of tokenizing in character units S410 may be a process of creating an input vector at a character-level in order to implement an encoder-decoder model that learns a language model of characters appearing in a query sentence. For this, a one-hot encoding vector of the character vocabulary may be used unlike the previous step S300 in which the word embedding vector is used.

In an exemplary embodiment, the step of learning a character expression-based embedding model S420 may be a process of training an encoder-decoder model for learning a language model of characters appearing in the query sentence. In this step, a language model between letters appearing together in a sentence may be trained through this learning process. Through this, the relationship between the letters constituting the sentence can be vectorized. Also, it is possible to predict the letters constituting the sentence through the decoder.

In an exemplary embodiment, the step of performing character-level embedding S430, similar to the process of embedding the query sentence using the semantic features in the previous step S300, may be a process of generating a sentence expression vector having only the expression information of the sentence using only the characters.

In an exemplary embodiment, the step of measuring the expressive similarity based on an embedding vector S440 may be a process of measuring an explicit similarity such as a letter and a structure of an input sentence using the analyzed sentence expression vector. This step is to respond to input dialogues that are difficult to measure semantic similarity or are not related to the applied domain. In this step, it may be possible provide a response to an emotional expression mainly, such as greeting or abusive languages. As in the previous step S300, a method of measuring the similarity between vectors may be used, and in an exemplary embodiment, the cosine similarity may be used.

Figure 9:
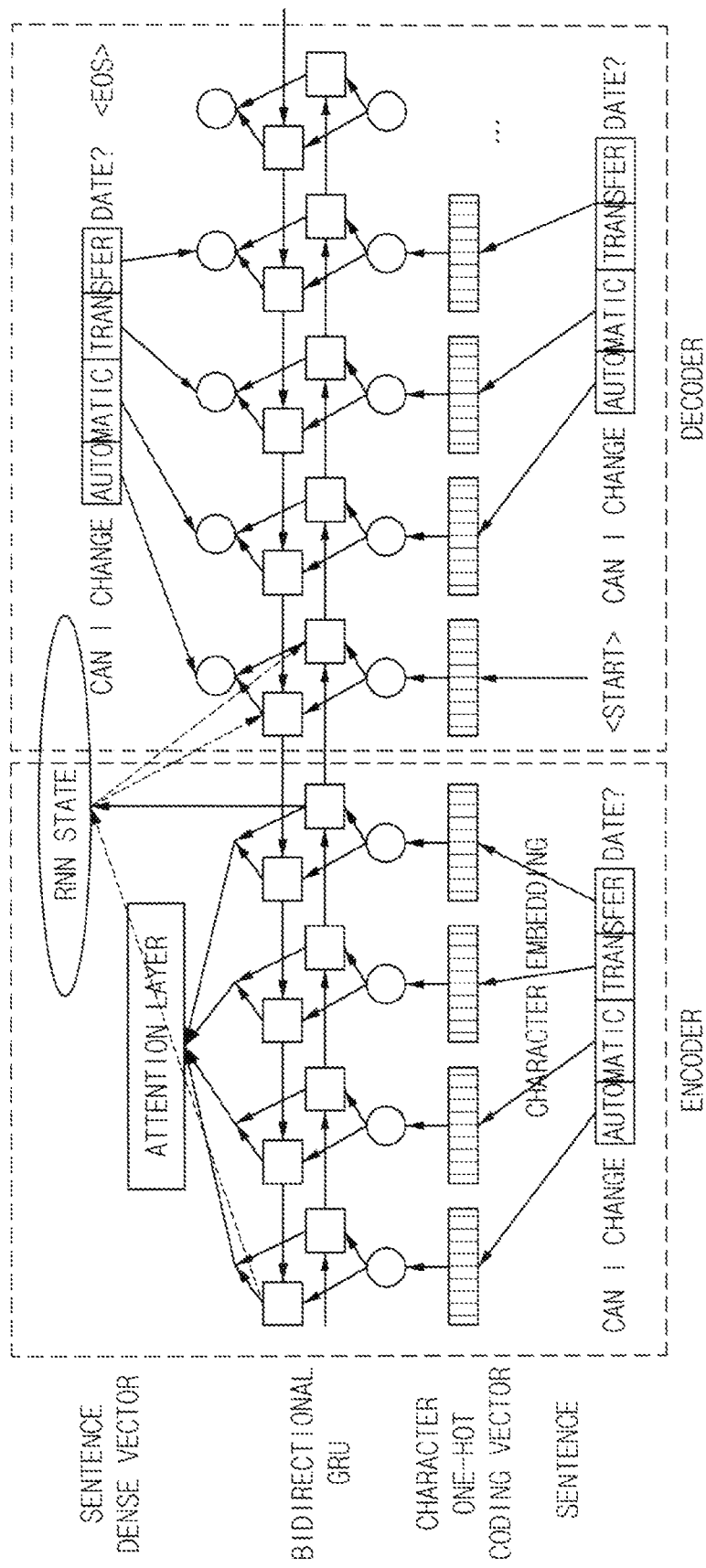
FIG. 9 illustrates a character embedding model used for analysis of expressively similar questions according to an exemplary embodiment of the present invention, in which each character is fed to each neural network as an input, and information of letters, expressions, and structure that appear together in a sentence is learned and then reflected on the embedding vector.

FIG. 9 illustrates a character embedding model used for analysis of expressively similar questions according to an exemplary embodiment of the present invention. Each character is fed to each neural network as an input. Information of letters, expressions, and structure that appear together in a sentence is learned, and this information is reflected on the embedding vector.

Figure 6:
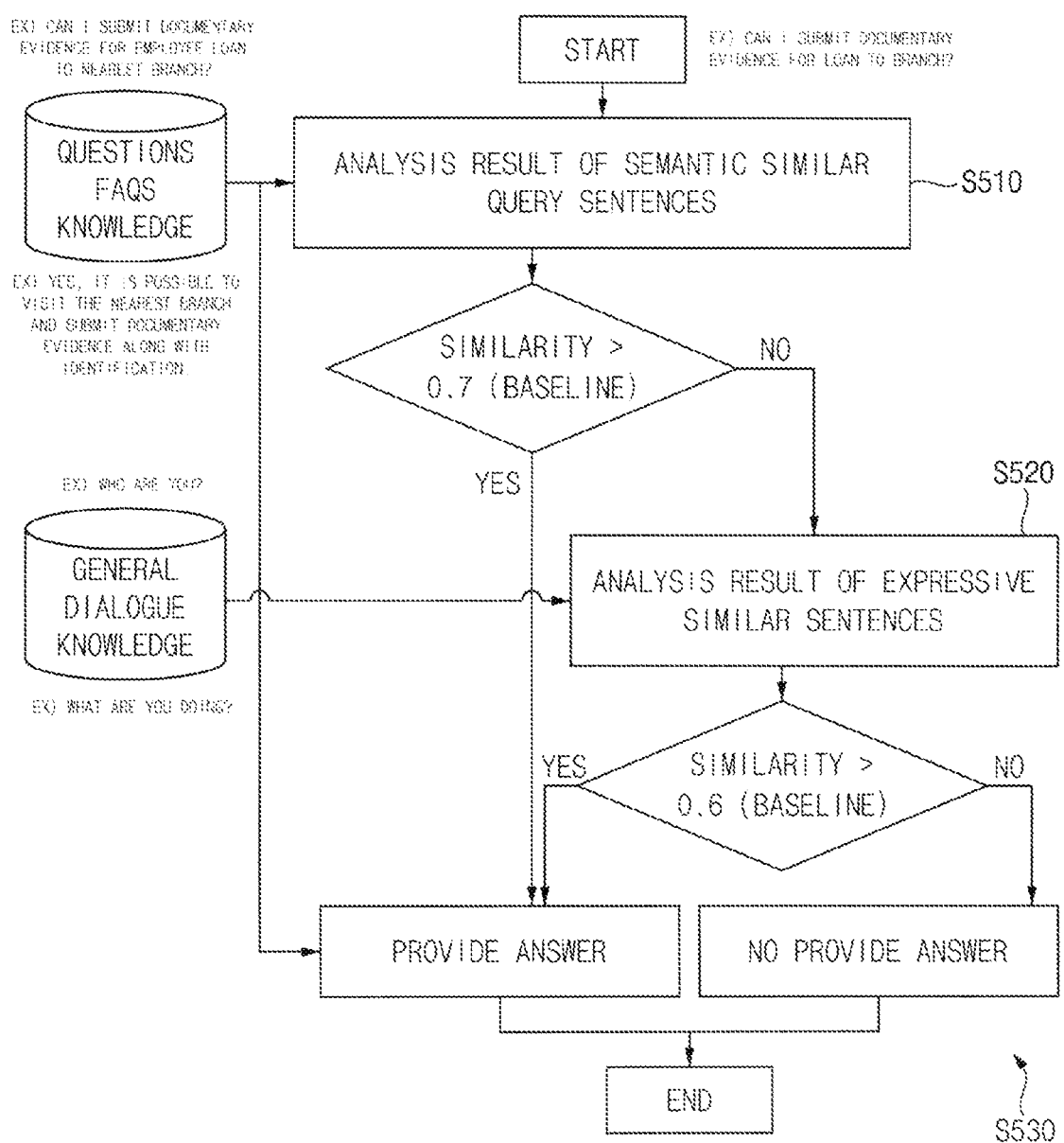
FIG. 6 is a detailed flowchart of the step of providing an answer to a similar question according to an embodiment of the present invention.

FIG. 6 illustrates a detailed flowchart of the step of providing an answer to a similar question S500 according to an embodiment of the present invention.

Referring to FIG. 6, the step of providing an answer to a similar question S500 according to an embodiment may include a step of analyzing a semantic similarity question S510 and a step of analyzing a similar question in expression S520. The step of providing an answer to a similar question S500 may also include a step of searching for a question which is similar to the input question from the FAQ using the similarity result analyzed through the preceding steps, and determining whether or not to provide an answer S530.

In an exemplary embodiment, the semantic similarity question analysis step S510 and the expressive similarity question analysis step S520 may be a process of providing the answer in step S530 of determining whether or not to provide a similarity answer by determining whether the similarity measurement value (score) analyzed in the previous steps (S300 and S400) exceeds a reference score or not. In an exemplary embodiment, the semantic similarity may be, for example, 0.7 as the reference value for determining the similarity. That is, an answer to frequently asked questions (FAQ) showing a similarity of 0.7 or higher is provided, and for the expressive similarity, 0.6, for example, may be used as a reference value for determining the similarity. That is, an answer of general conversational knowledge showing a similarity of 0.6 or more may be provided.

FIG. 10 shows an exemplary result of a similarity measurement between an input query sentence and a similar sentence recognized as a paraphrase.

As described above, the present invention can provide a source technology for developing a chat-bot that can understand the content of consultation made in natural language and give an appropriate response. The embodiments of the present invention described above may be implemented as a computer program that can be executed in a computer device. The computer program may be made into an executable file, and by executing the executable file on a computer device, various functions described above may be performed to obtain a desired result. And the executable file may be stored in a non-transitory or non-volatile recording medium (e.g., a hard disk drive, a flash memory, CD-ROM, etc.) that can be read by a computer device. The executable file may be executed, for example, by a processor provided in a general-purpose computer device to express respective functions.

Features, structures, effects, etc. described in the above embodiments are included in any one embodiment of the present invention, and are not necessarily limited to one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the present invention.

In addition, although the embodiments have been described above, the foregoing is illustrative of embodiments and is not to be construed as limiting thereof. Those of ordinary skill in the art to which the present invention pertains will readily appreciate that many modifications are possible in the embodiments without materially departing from the novel teachings and advantages of the present inventive concept. For example, each element specifically shown in the embodiments can be implemented by modification. And differences related to such modifications and applications should be construed as being included in the scope of the present invention defined in the appended claims.

What is claimed is:

1. A method of responding based on sentence paraphrase recognition for a dialog system, executable by a processor of a computer device, comprising the steps of:
    extracting main keywords of a technology application domain and patterns thereof by recognizing them based on a morpheme analysis result obtained through analysis of morphemes in a pre-processing process;
    classifying question domains/detailed categories/dialogue-acts using the morpheme analysis result obtained from the pre-processing process and the extracted main keywords and patterns;
    analyzing a semantic similar question for measuring similarity between sentence semantic vectors by learning a model using classification features obtained from classified question domains, detailed categories, and dialogue-acts as semantic features of a question sentence, and by extracting the sentence semantic vectors;
    analyzing an expressive similar question, through learning a language model of letters, by extracting a sentence expression vector based on the letter and analyzing similarity in expression and structure; and
    providing an answer to a similar question by generating a vector containing semantic and expressive information about an input query sentence that can be input in various forms based on analyzed semantic similarity and expressive similarity, and finding a similar query sentence, for which the answer is provided, from FAQ knowledge using a paraphrase recognition technology.

2. The method according to claim 1, wherein the step of 'extracting main keywords of a technology application domain and patterns thereof' comprises: recognizing an entity name dedicated to the technology application domain; extracting a compound word information additionally specialized for the application domain by using the morpheme analysis results; analyzing synonym/hypernym to normalize a specific term expression or analyze synonym information or hypernym information of a specific expression; and extracting a question expression pattern to pattern question expressions of entity names, compound words, synonyms, and hypernyms extracted in the previous step for the input query according to connection relationship.

3. The method according to claim 2, wherein the step of 'extracting main keywords of a technology application domain and patterns thereof' comprises building a domain-specific entity name and compound word dictionary based on the morpheme analysis result obtained in the pre-processing process; and building a relationship of vocabularies in the built entity name and compound word dictionary with a thesaurus or lexical network of synonyms and hypernyms.

4. The method according to claim 1, wherein the step of 'classifying question domains/detailed categories/dialogue-acts' comprises a first learning step and a classification step,
    wherein the first learning step includes: tagging and constructing learning data to tag query sentence classification system features for Q & A specialized in a system application domain for each question; and learning a question intention classification model to train a deep learning-based classification model with learning data built, and
    wherein the classification step includes 'classifying question intention' to perform feature analysis on a new input query sentence using a learned classification model; and 'textualizing analysis result and semi-automatically tagging additional learning data' to modify and additionally build learning data through analysis process and review of features of additional test query sentences using a trained model.

5. The method according to claim 1, wherein the step of 'classifying question domains/detailed categories/dialogue-acts' comprises making learning data using the obtained morpheme analysis result and the extracted important keywords and patterns in the pre-processing process, learning a classification model based on the learning data, and extracting the corresponding classification features for a new query sentence.

6. The method according to claim 1, wherein the step of 'analyzing a semantic similar question' comprises a second learning step and a first similarity analysis step,
    wherein the second learning step comprises 'a sentence morpheme tagging and semantic quality (domain, dialogue act) classification step' in which a word embedding vector of sentence morpheme learned with a result of analysis by a language analyzer (morpheme tagging) and classification features analyzed through a classification model are used as semantic features and structured into an input structure; and 'a semantic feature based sentence embedding model learning step' in which trains a deep learning model that combines a Seq2Seq-based encoder-decoder model and a learned classification model, and
    wherein the first similarity analysis step comprises a question intent embedding step of embedding a new input query sentence into a sentence semantic vector using the learned encoder model; and an embedding vector-based semantic similarity measurement step in which a similarity between a query sentence and FAQ questions with refined answer knowledge is measured through a similarity measurement method between vectors using sentence semantic vectors converted.

7. The method according to claim 1, wherein the 'question intent embedding step' comprises converting the input query sentence into a real vector of a desired dimension.

8. The method according to claim 1, wherein the step of 'analyzing an expressive similar question' comprises a third learning step and a second similarity analysis step, wherein the 'third learning step' comprises a 'character-level tokenization step' of generating an input vector at a character-level to implement an encoder-decoder model that learns a language model of a character appearing in a query sentence; and a 'character expression-based embedding model learning step' of learning the encoder-decoder model of the letters appearing in the query sentence, wherein the 'second similarity analysis step' comprises a character-level embedding performing step of using the learned character-level embedding model and generating a sentence expression vector having only expression information of a sentence using characters only; and an embedding vector-based expressive similarity measurement step of measuring explicit similarity of the input sentence with respect to letter and structure using sentence expression vectors analyzed.

9. The method according to claim 1, wherein the 'step of analyzing an expressive similar question' comprises learning a language model of letters, and extracting a sentence expression vector based on the letters, and analyzing similarity in expression and structure of the sentence expression vector.

10. The method according to claim 1, wherein the 'step of providing an answer to a similar question' comprises a semantic similarity question analysis step and an expressive similarity question analysis step, and includes searching for a FAQ question similar to the input question using the analyzed similarity result, and determining whether to provide an answer or not.

11. The method according to claim 1, wherein the 'step of providing an answer to a similar question' comprises recognizing a paraphrase sentence of a purified FAQ query sentence based on the analyzed semantic similarity and expressive similarity, and providing an answer to the corresponding FAQ question sentence according to a similarity score.

* * * * *